United States Patent [19]

Van Gerwen

[11] 3,772,598

[45] Nov. 13, 1973

[54] TRANSMISSION SYSTEM FOR THE TRANSMISSION OF PULSES

[75] Inventor: Petrus Josephus Van Gerwen, Emmasingel, Eindhoven, Netherlands

[73] Assignee: U.S. Philips Corporation, New York, N.Y.

[22] Filed: Dec. 7, 1971

[21] Appl. No.: 205,748

Related U.S. Application Data

[63] Continuation of Ser. No. 532,744, March 8, 1966, abandoned.

[52] U.S. Cl. .................... 325/50, 325/137, 178/68, 325/330

[51] Int. Cl. .................... H04b 1/68

[58] Field of Search .................... 340/347 DD; 325/38 R, 38 A, 49, 50, 137, 330; 178/66 A, 66 R, 68

[56] References Cited

UNITED STATES PATENTS

| | | | |
|---|---|---|---|
| 2,995,618 | 8/1961 | Van Dauren et al. | 178/66 A |
| 3,100,871 | 8/1963 | Richardson et al. | 325/330 |
| 3,147,437 | 9/1964 | Crafts et al. | 325/137 X |
| 3,303,284 | 2/1967 | Lender | 178/68 |
| 3,337,864 | 8/1967 | Lender | 178/68 |

*Primary Examiner*—Benedict V. Safourek
*Attorney*—Frank R. Trifari

[57] ABSTRACT

The frequency spectrum of bivalent pulses is modified for transmission as a suppressed carrier single side-band signal. The frequency response shaping network characteristics are sin $n\pi\pi f T$, with $T$ being the period of the bivalent pulses, $f$ their frequency and n an integer, including zero. A pilot of the same frequency as the suppressed carrier is transmitted to the receiver which contains an amplitude demodulator and pulse regenerator.

7 Claims, 12 Drawing Figures

INVENTOR.
PETRUS J. VAN GERWEN
BY
[signature]
AGENT

INVENTOR.
PETRUS J. VAN GERWEN
BY
Frank R. Trifari
AGENT

INVENTOR.
PETRUS J. VAN GERWEN
BY
[signature]
AGENT

INVENTOR.
PETRUS J. VAN GERWEN
BY
AGENT

INVENTOR.
PETRUS J. VAN GERWEN
BY
[signature]
AGENT

TRANSMISSION SYSTEM FOR THE TRANSMISSION OF PULSES

This is a continuation of application Ser. No. 532,744, filed Mar. 8, 1966 now abandoned.

The invention relates to a transmission system for the transmission of information signals constituted by bivalent pulses which appear at instants which coincide with a train of equidistant clock pulses from a transmitter station to a receiver station, the pulses being applied in the transmitter station to an amplitude modulator with an associated carrier wave oscillator, while the receiver station includes an amplitude demodulator and a subsequent pulse regenerator, for recovering the emitted pulses.

Such transmission systems are used inter alia for the transmission of numerical information through telephone lines in the telephone switching network or through similar speech channels. Various modulation- and demodulation techniques have already been suggested.

The invention has for its object to provide a transmission system for a completely new mode of transmitting pulse signals in which not only extremely simple apparatus is attained, but also the transmission speed possible with a given frequency band is increased to a maximum.

A transmission system in accordance with the invention is characterized in that the transmitter station is provided with a transmission network which has a transmission characteristic corresponding with a subtraction device to which the input signal is supplied on the one hand directly and on the other hand through a delay member while a single side-band filter is included between the output circuit of the amplitude modulator and the input circuit of the amplitude demodulator, at least one pilot signal accompanying the transmitted output signals of the amplitude modulator.

The invention and its advantages will now be described more fully with reference to the figures.

Figure 1:
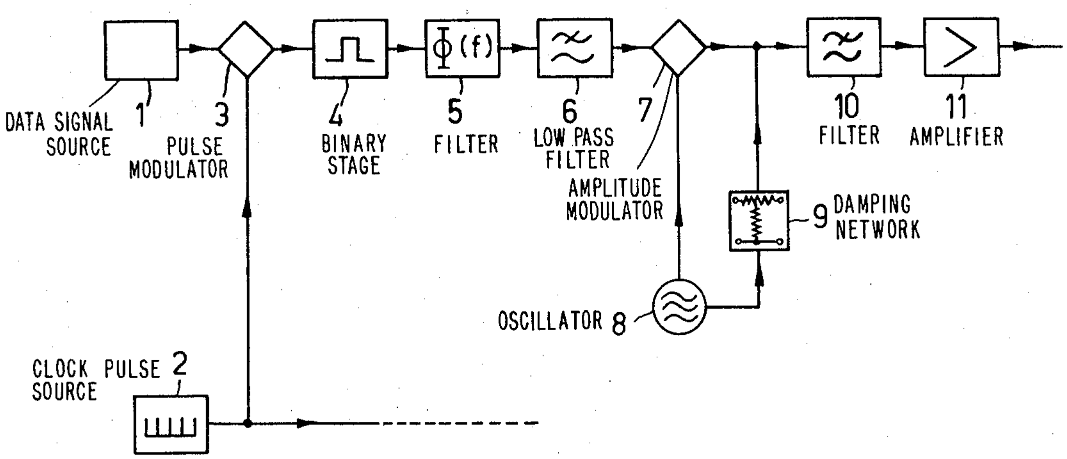
FIG. 1 shows an embodiment of a transmitting device in accordance with the invention.
Figure 3:
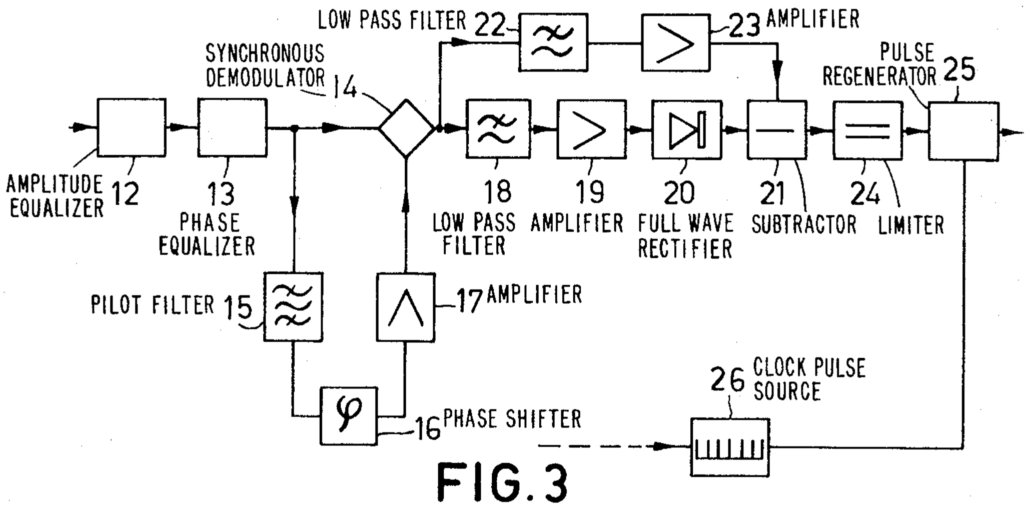
FIG. 3 shows an embodiment of a receiving device in accordance with the invention.
Figure 6:
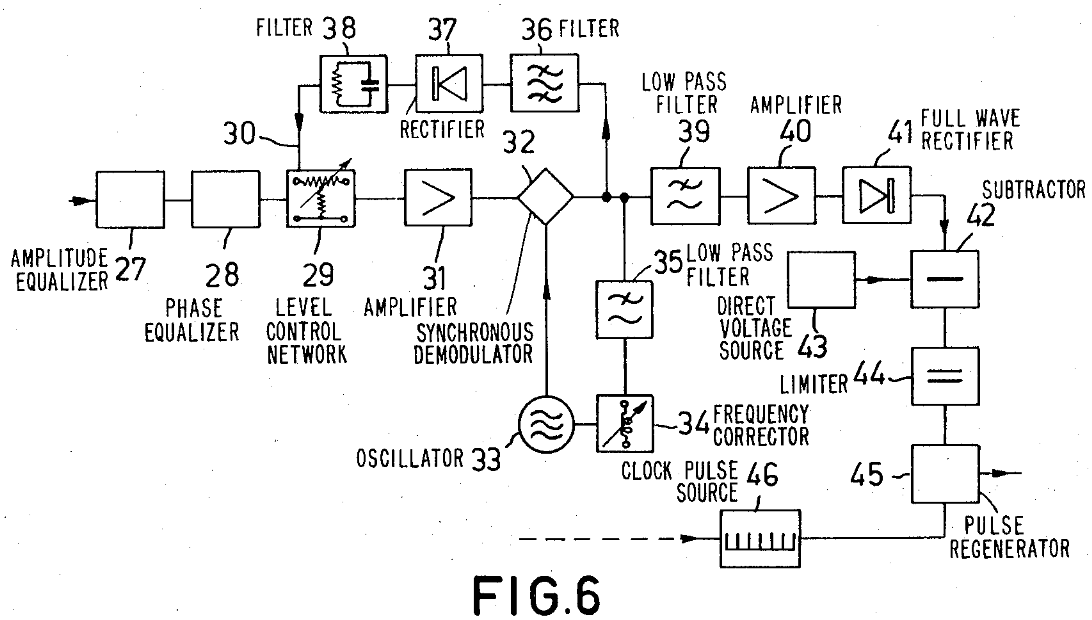
FIG. 6 shows by way of example a preferred embodiment of a receiving device in accordance with the invention.
Figures 7A, 7B, 8:
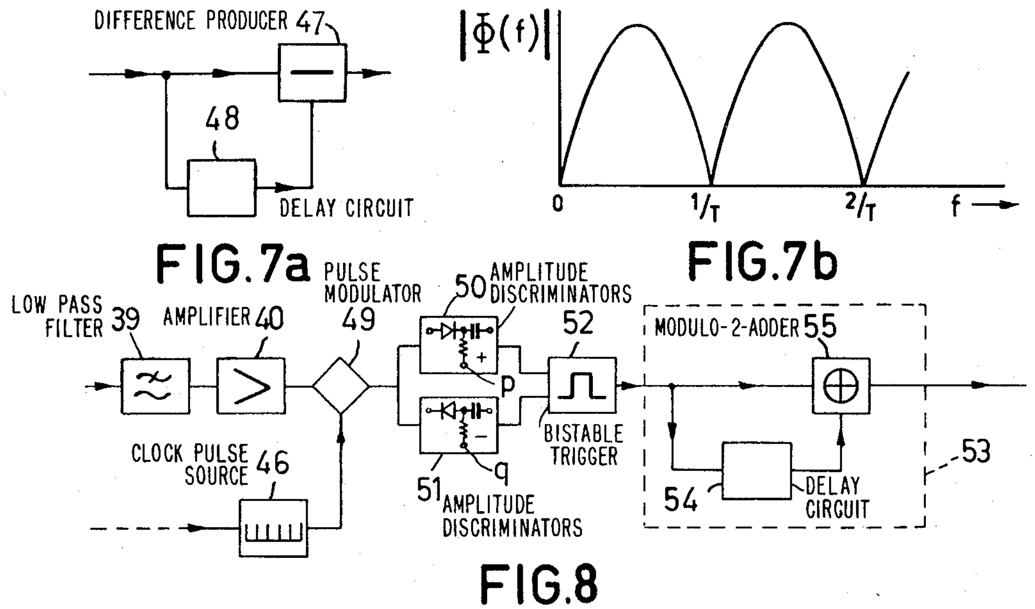
Figure 9:
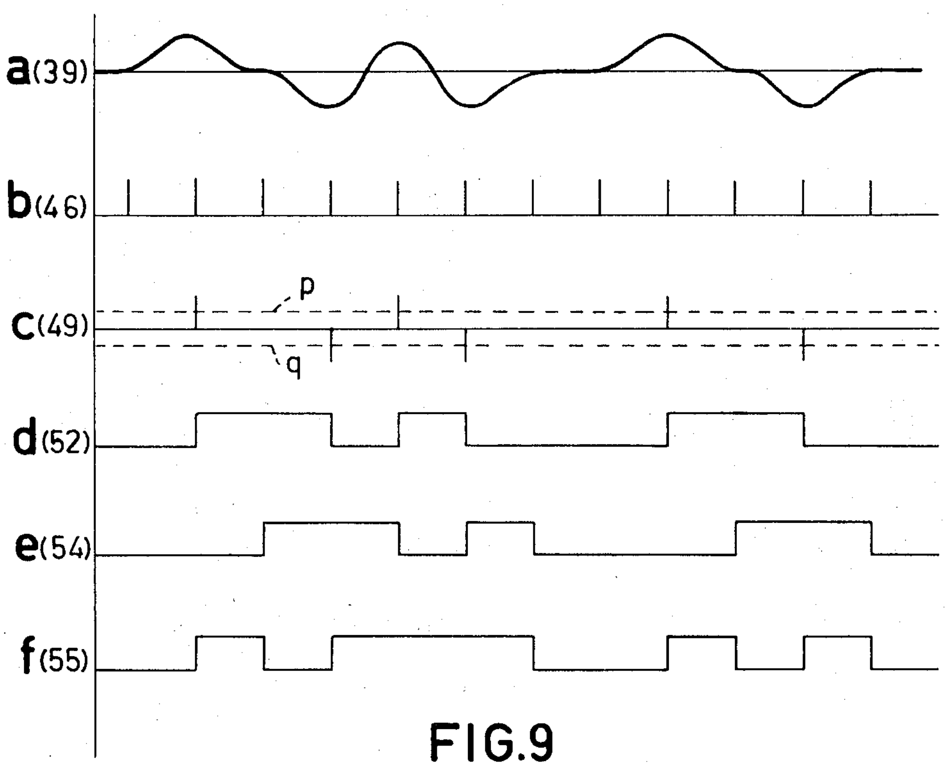
Figure 10:
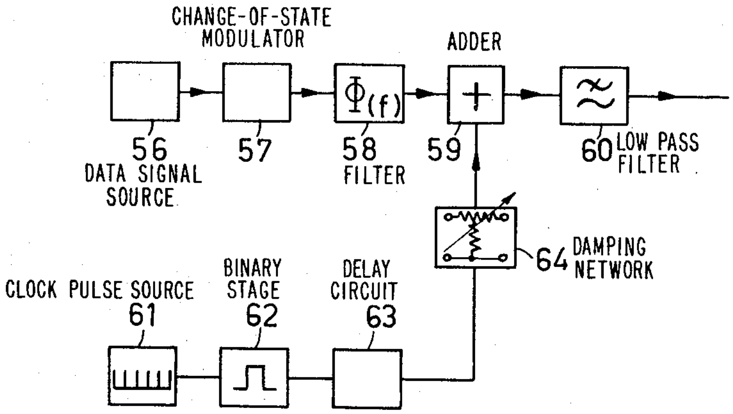
Figure 11:
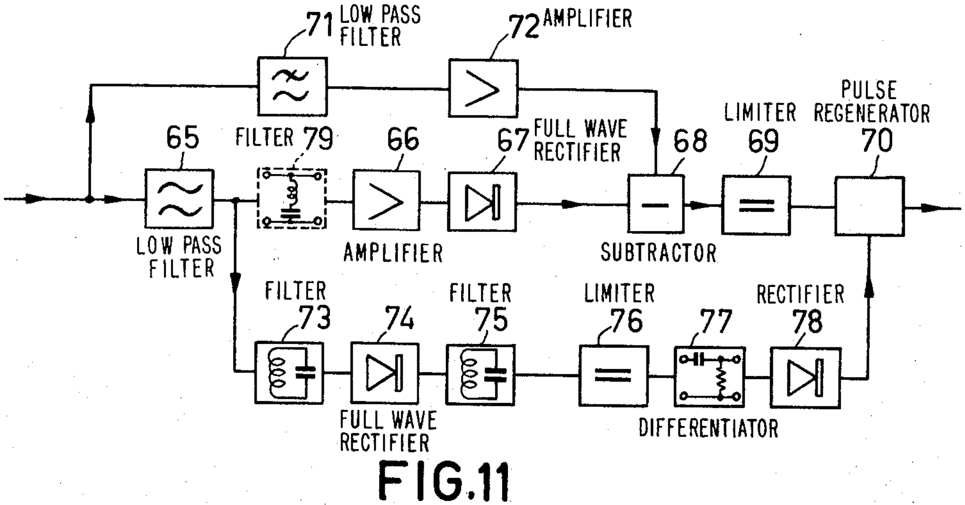

FIGS. 7*a* and 7*b* show an embodiment of a part of the transmitting device shown in FIG. 1 and the transmission characteristic curve thereof, FIG. 8 shows an alternative embodiment of the receiving device shown in FIG. 6, FIG. 9 illustrates signal wave forms associated with FIG. 8, FIG. 10 shows an alternative embodiment of the transmitting device shown in FIG. 1, FIG. 11 shows an alternative embodiment of the receiving device shown in FIG. 3.

The transmission system concerned serves for the transmission of data signals constituted by a train of bivalent data pulses appearing during subsequent pulse periods of equal duration and having a fixed time position in each pulse period. The bivalence of the data pulses may become manifest in their amplitude or in their polarity. It is assumed that the first case is concerned here in which more particularly the presence of a pulse is representative of one value thereof, while the absence of a pulse is representative of the other value. In the transmission system concerned, the duration of a data pulse is equal to the pulse period so that a data pulse is the equivalent of a mark element in a telegraph signal while the absence of a data pulse is the equivalent of a space element. The data signal can thus be considered as a non-interrupted sequence of mark-and space elements of the same ration. The pulse periods of the data signal are identified with the aid of a periodical clock signal having the same period as the data signal and having a suitably chosen time position with respect to data signal. In the transmission system concerned, this clock sign is constituted by a train of equidistant clock pulses of short duration which are indicative of the centres of the pulse periods the data signal. These centres of the pulse periods are suitable instants to ascertain the value of the data pulses by means of an amplitude discrimination. The number of mark- and space elements transmitted per second (referred to hereinafter as transmission sp is equal to the pulse repetition frequency of the clock pulses (referred to hereinafter as pulse frequency).

In the transmission system concerned, it is the intention to transmit a data signal via a telephone line, in which case it is required for the data signal to modulate a carrier wave. It is suggested in this application to transmit the data signal by means of suppressed-carrier single sideband amplitude modulation with synchronous detection at the receiver end. Thus, a single data channel is obtained which permits of attaining extremely simple apparatus and comparatively very high transmission speeds. In order to render this mode of modulation possible, the frequency spectrum of the data signal is first modified in a suitable manner. In order to simplify the detection of the data signal at the receiver end, this spectrum modification is combined at the transmitter end with a preceding signal transformation. This signal transformation and the subsequent spectrum modification are tuned to each other so that a data signal which has been subjected to these successive processes can be converted by full-wave rectification into the original data signal. The frequency spectrum is modified with the aid of a spectrum factor: sin $n\pi$ fT, by which the frequency spectrum of the date signal is multiplied. In this formula, $f$ denotes the frequency in c/s and T the clock pulse period in seconds. Suitable values for $n$ are $n=1$, $n = 2$, . . . For the time being, only the case $n = 1$ is described. The signal transformation associated with the said spectrum factor can be obtained by modulo 2 addition of the data signal and the data signal delayed by $n$ pulse periods ($n = 1$). The same result can be obtained by using a modulation method which is known under the name of "change-of-state modulation." It should be noted that for values of $n$ which are powers of two the required signal transformation can invariably be obtained by carrying out $n$ consecutive change-of-state modulations, for example, for $n = 2$ two consecutive change-of-state modulations. It should further be noted that the data signal obtained after signal transformation, just as the original data signal, is constituted by a non-interrupted sequence of mark- and space elements and therefore has essentially the same frequency spectrum as the original data signal.

Figure 2:
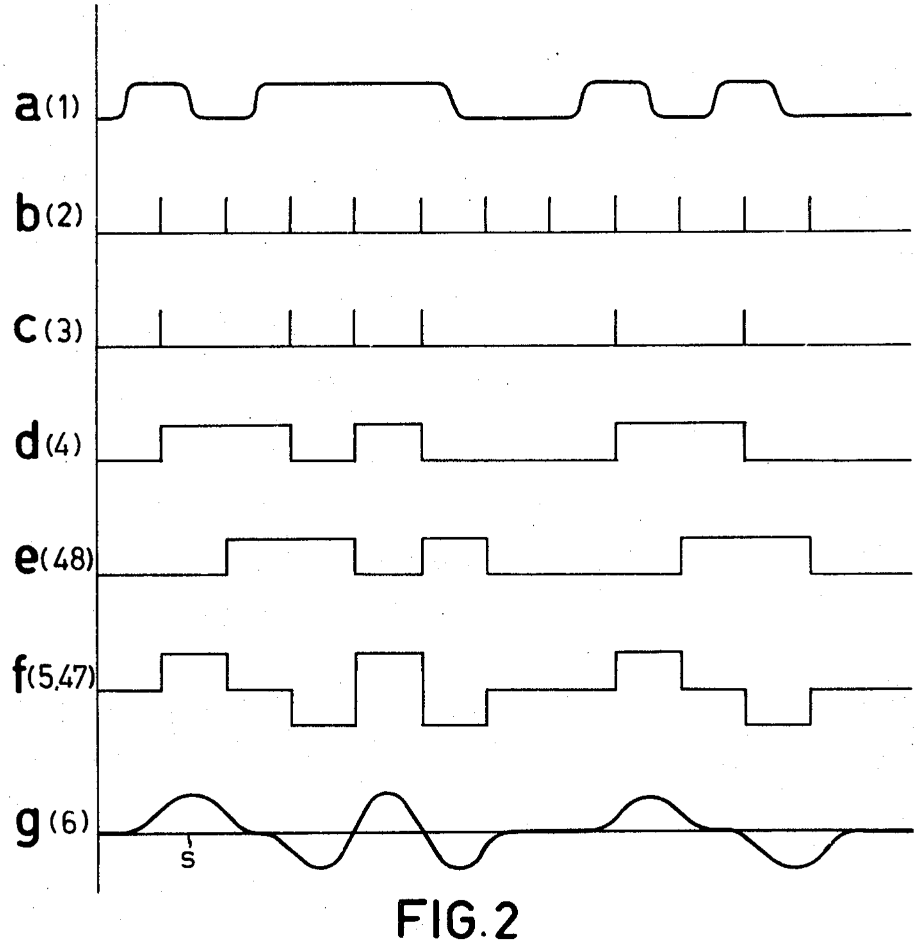
FIG. 2 illustrates signal wave forms associated with FIG. 1.

The data signal source 1 in the transmitting device shown in FIG. 1 supplies a data signal to the input of a pulse modulator 3 which is driven by a clock pulse source 2. This clock pulse source supplies a train of equidistant clock pulses which are indicative of the centres of the pulse periods of the data signal. The pulse modulator is controlled by the data signal so that in response to a clock pulse it supplies an output pulse for each mark element and does not supply an output pulse if the signal element supplied in a space element. The output pulses of pulse modulator 3 are supplied to the input of a binary stage 4. This stage has two stable states and changes its state in response to each input pulse. This signal transformation is illustrated in detail by the signals shown in FIG. 2. In this figure and the following figures, the devices supplying the signals are designated by the relevant reference numerals placed between brackets. FIG. 2*a* shows a representative data signal the mark elements of which have a high signal level while its space elements have a low signal level. FIG. 2*b* shows the associated train of clock pulses. The pulse train shown in FIG. 2*c* appears at the output of pulse modulator 3, which pulse train contains a pulse of short duration for each mark element. The output signal of the binary stage 4 is shown in FIG. 2*d*. As is apparent from FIG. 2*d*, this signal is constituted by a non-interrupted sequence of mark- and space elements in the same general manner as the original data signal. This signal transformation, referred to as "change-of-state modulation," has for its sole object to render it possible to obtain a simple detection of the data signal at the receiver end. In principle, this signal transformation can be dispensed with. An example will be given in the following description.

The output signal of the binary stage 4 is supplied to the input of a filter device 5 the amplitude-frequency characteristic curve Φ (*f*) of which can be repesented by the expression sin nπfT (*n*=1). The desired amplitude-frequency characteristic curve can be obtained in the manner illustrated in FIG. 7*a* by means of a difference producer 47 to which the input signal is supplied on the one hand directly and on the other hand through a delaying member 48 having a delay time $nT$ ($n = 1$). This amplitude-frequency characteristic curve is illustrated in FIG. 7*b*. This method has the advantage that the phase-frequency characteristic curve has a linear course. Circuits of this type are disclosed, for example, in Bell System Technical Journal volume 41, 1962, pages 99 et seq., and Philips Research Reports, volume 20, No. 4, August 1965, pages 469–484. The circuits convert their input signals to pseudo-ternary or bipolar codes. In principle the desired amplitude-frequency characteristic curve may be obtained with the aid of a filter network consisting of resistors, capacitors and coils, if desired in conjunction with the low band-pass filter 6. The output signal of the filter device 5 is then supplied through a low-bandpass filter 6 to the input of an amplitude modulator 7. The spectrum modification is illustrated in detail by the signal shown in FIG. 2, it being assumed that the filter device 5 is constructed in the manner shown in FIG. 7*a*. FIG. 2*e* shows the output signal of the delaying member 48. This signal is subtracted in the subtraction device 47 from the undelayed output signal of the binary stage 4, which results in the output signal of the subtracted device 47 illustrated in FIG,2*f*. This signal is trivalent an is constituted by a non-interrupted sequence of positive, negative and zero elements of the same duration. It is apparent from a comparison of the FIGS. 2*a* and 2*f* that the positive and the negative elements correspond with the mark elements and that the zero elements correspond with the space elements of the original data signal. The original data signal can then be recovered by full-wave rectification of the output signal of the filter device 5. After the output signal of filter device 5 has passed through filter 6 having a cut-off frequency slightly exceeding half the pulse frequency, it takes the wave form illustrated in FIG. 2*g*. In this figure, the zero level is indicated with a line *s*. It is apparent from a consideration of the spectrum factor illustrated in FIG. 7*b* that zero points are found in the frequency spectrum of the modified data signal at the frequency zero c/s and at an integral multiple of the frequency $1/T$ which is equal to the pulse frequency. The zero point at the frequency zero c/s and the course of the spectrum factor as a function of the frequency in the vicinity of zero c/s are of particular importance, since the direct-current component of the data signal is fully suppressed and the low-frequency spectrum components are strongly attenuated thereby. As a result, a void occurs in the frequency spectrum of the data signal in the vicinity of zero c/s.

The output signal of the filter 6 is supplied to the input of an amplitude modulator 7 which is driven by a carrier wave oscillator 8. The output signal of the amplitude modulator is a double sideband amplitude modulation signal the carrier wave of which is suppressed. By means of a damping network 9, a pilot signal of carrier frequency and of a low signal level is derived from the carrier wave oscillator 8 and is added to the output signal of the amplitude modulator. The output signal of the amplitude modulator is then passed together with the pilot signal through a single sideband filter 10 which cuts off the upper sideband and the higher-order modulation products. The remaining lower sideband and the pilot signal are then transmitted to the receiver station after being amplified by an amplifier 11.

The described method of adding the pilot signal at the input end of the single sideband filter 10 has the advantage that the transit time of the single sideband filter need not be compensated for by a separate network. However, it should be ensured that the single sideband filter does not exhibit an extremely high damping at the carrier frequency. The use of a single sideband filter having a high damping at the carrier frequency remains possible, however, when the pilot signal is added at the output end of the single sideband filter. Owing to the described spectrum modification, the frequency components of the double sideband amplitude modulation signal are already considerably attenuated in the vicinity of the carrier frequency. The single sideband filter 10 constructed in the form of a low-band-pass filter supplies such a complementary damping that the upper sideband is suppressed to the desired extent (for example by more than 30 dB). Thus, a real mode of single side-band pulse transmission is achieved in which the damping- and phase distortions occurring in the frequency range of the upper sideband do not cause difficulties so that the required frequency bandwidth is limited to a minimum.

The amplitude modulation method described above involves a frequency transposition from the signal frequencies $f$ to the lower side-band frequencies $fo\text{-}f$, $fo$ representing the carrier frequency. The spectrum factor sin $n\ \pi\ fT$ is converted by this frequency transposition into the factor sin $n\ \pi\ (fo\text{-}f)\ T$. In principle, it is then possible to invert the order of succession of the spectrum modification and the amplitude modulation by the use of a filter device the amplitude-frequency characteristic curve of which is expressed by: sin $n\pi(fo\text{-}f)T$. Such a filter device can be achieved by the use of resistors, capacitors and coils and would have to be included between the output of the amplitude modulator 7 and the input of the single sideband filter 10.

The following explanatory data can be stated of a transmission system tested in practice the transmitting device of which has been described hereinbefore:

a. Transmission speed: 4000 Baud (pulse frequency 4000 c/s)
b. cut-off frequency filter 6: 2100 c/s
c. carrier-wave frequency: 3000 c/s
d. single sideband filter 10: 3 db damping at 2800 c/s; 15 dB damping at 3200 c/s
e. suppression upper sideband higher than 30 dB
f. overall bandwidth of the transmitting device and the receiving device measured between the 3 dB damping points: 1200 c/s.

Figure 5:
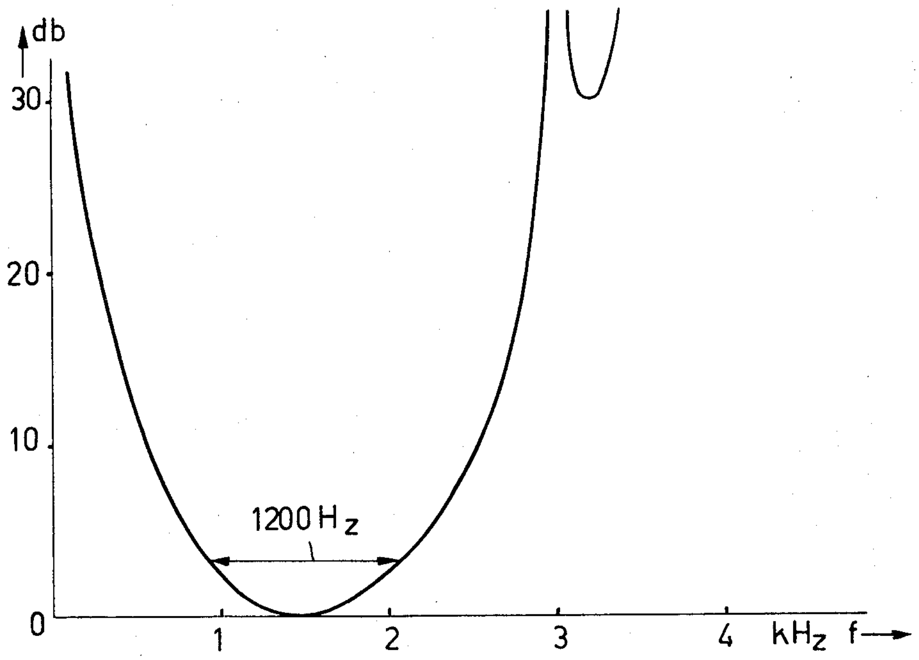
FIG. 5 shows an example of a transmission characteristic curve of the transmission system in accordance with the invention.

The points $e$ and $f$ are illustrated in FIG. 5 in which the transmission characteristic curve of the transmitting device and that of the receiving device are shown. In this figure, the damping in dB is plotted on the ordinate while the frequency in kc/s is plotted on the abscissa. It should be noted that the contribution of the receiving device to the transmission characteristic curve only consists of the filter characteristic curve of a low-bandpass filter having a cut-off frequency which slightly exceeds half the pulse frequency. The transmission characteristic curve shown is therefore mainly determined by the transmission characteristic curve of the transmitting device.

The signal received by the receiving device shown in FIG. 3 is supplied through an amplitude- and phase-equalizing network 12 and 13, respectively, to the input of a synchronous demodulator 14. A pilot signal filter 15 selects from this signal the pilot signal of carrier frequency. The selected pilot signal is supplied, as the case may be ater correction by a phase-correcting network 16 and after subsequent amplification by a pilot-signal amplifier 17, to the synchronous demodulator 14 for the synchronous demodulation of the single sideband signal. The demodulated single sideband signal is supplied through a low bandpass filter 18 and after subsequent amplification by an amplifier 19 to a full-wave rectifying circuit 20. The output signal of the full-wave rectifying circuit 20 is a bivalent signal. A suitable discrimination level for discrimination between the two values of the signal lies midway between the maximum and the minimum signal level thereof. Such a discrimination level varies with the strength of the signal. For this reason a direct-voltage signal the level of which is equal to the discrimination level and which varies in the same manner with the signal strength is subtracted from the output signal of the rectifying circuit 20. Such a direct-voltage signal can be derived from the output of demodulator 14 at which a direct voltage is produced owing to the synchronous demodulation of the pilot signal, which direct voltage is proportional to the level of the pilot signal. This direct voltage is selected by means of a low-bandpass filter 22 having a very low cut-off frequency and is supplied, after being amplified to the desired value by an amplifier 23, to one of the two inputs of a subtraction device 21. The other input of the subtraction device has supplied to it the output signal of the rectifying circuit 20 from which the direct-voltage signal supplied to the first-mentioned input is subtracted. The discrimination level of the output signal of the subtraction device 21 is the zero level thereof which does not vary with the signal strength. The output signal of the subtraction device 21 is supplied to the input of an amplitude-limiting amplifier 24 having an input which is symmetrical with respect to the zero level of the input signal. This amplifier limits the input signal after amplification to two limit levels located symmetrically with respect to the zero level, that is to say that positive input signals are limited to a positive signal level while negative input signals are limited to a signal level which is equally high but negative. The output signal of the amplifier 24 has a standardized amplitude but has not yet the wave form standardized for a data signal. This input signal is then supplied to the input of a pulse regenerator 25 which is driven by a clock pulse source 26. This clock pulse source which is synchronized with the clock pulse source 2 at the transmitter end in a manner not shown supplies a train of equidistant clock pulses which are indicative of the centres of the signal elements of the output signal of the emitter 24. The pulse regenerator 25 has two stable positions and in response to a clock pulse it changes to the position which corresponds with the polarity of the input signal or it remains in this position if the latter has already been adjusted. The output signal of the pulse regenerator 25 is a data signal of standardized wave form which under suitable transmission conditions is identical with the emitted data signal.

Figure 4:
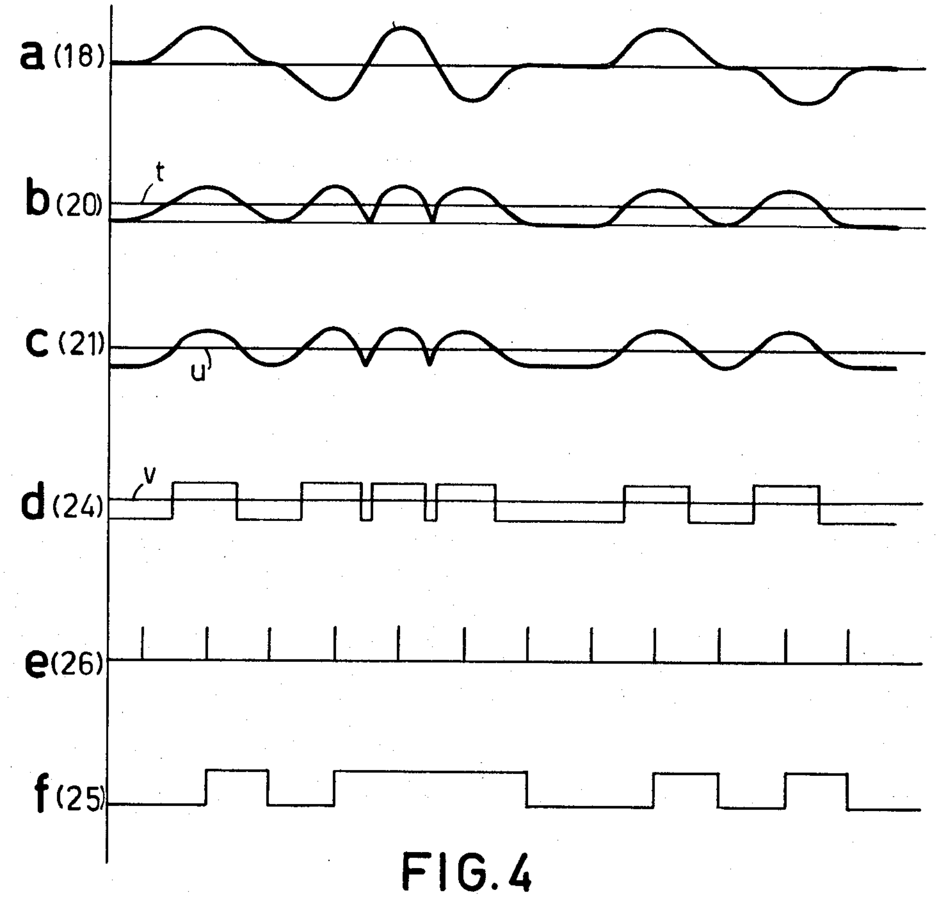
FIG. 4 illustrates signal wave forms associated with FIG. 3.

The detection of the data signal is illustrated in detail by the signals shown in FIG. 4. FIG. 4*a* shows a representative output signal of the filter 18. After full-wave rectification, the signal shown in FIG. 4*b* is formed. The discrimination level of this signal is indicated with a line $t$. After the subtraction of a direct-voltage signal having a level equal to the discrimination level ($t$), the signal shown in FIG. 4*c* is obtained the discrimination level of which is indicated with the line $u$. By bilateral amplitude limitation of this signal, the signal shown in FIG. 4*d* is obtained the zero level of which is indicated with a line $v$. FIG. 4*e* shows the clock pulses which are indicative of the centre of the signal elements of the amplitude-limited signal. The output signal of the pulse regenerator 25, which is shown in FIG. 4*f*, is identical with the data signal shown in FIG. 2*a*.

It should be noted that the clock pulses at the receiver end can be derived from the demodulated single sideband signal when the fact is utilized that the peaks of the output signal of the filter 18 (FIG. 4*a*) have given time positions owing to the clock pulses at the transmitter end and that the relative time positions vary only slightly during transmission. After a suitable peak clipping, the signal peaks can then be used as synchronizing pulses for a local oscillator or as activating pulses for a flywheel circuit. By a suitable conversion process, the clock oscillation of stable phase produced at the output of the oscillator or of the fly-wheel circuit can then be converted into the desired train of equidistant clock pulses.

The receiving device shown in FIG. 6 is distinguished by an extremely great insensitivity to level- and frequency variations of the received signals. The signal received by the receiving device is supplied through an amplitude- and phase-equalizing network 27 and 28, respectively, to the input of a level control network 29. This level control network is controlled by a level control signal originating from a line 30. The level control network controls the damping in dependence upon the level control signal so that the level fluctuations at the output are strongly reduced with respect to the level fluctuations at the input thereof. The manner in which the level control signal is obtained is described hereinafter. The output signal of the level control network 29 is supplied, after being amplified by an amplifier 31, to the input of a synchronous demodulator 32 which is driven by a synchronous carrier wave oscillator 33. A frequency-correcting device 34 is connected to this carrier wave oscillator for re-adjusting the frequency of the oscillator in dependence upon a frequency control signal. This control signal is derived from the output of a low-bandpass filter 35 the input of which is connected to the output of the synchronous demodulator 32. The devices 32, 33, 34 and 35 together constitute an automatic phase-adjusting circuit which stabilizes the frequency and the phase of the oscillator signal to the frequency and to the phase respectively of the pulse signal acting as a control signal for the control circuit. This automatic phase adjustment involves a phase difference of 90° between the oscillator signal supplied to the synchronous demodulator and the pilot signal. In order to ensure that the oscillator signal in this case has the correct phase for the synchronous demodulation of the single sideband signal, in a manner not shown the pilot signal is first shifted in phase in the transmitting device by 90° and then added to the single sideband signal. With a suitable sensitivity of the control circuit, the phase difference between the pilot signal and the oscillator signal varies only slightly owing to frequency variations of the pilot signal so that the oscillator signal invariably has the correct phase, also in case of comparatively great frequency variations in the received signals.

The level control signal may be derived from the output of the demodulator at which, owing to the synchronous demodulation of the pilot signal, a frequency component of twice the carrier frequency is produced the level of which is proportional to the level of the pilot signal at the input of the demodulator. This frequency component is selected by a filter 36 tuned to twice the carrier frequency. After rectification by a rectifying circuit 37 and after subsequent smoothing by smoothing network 38 the output signal of the filter 36 is supplied through the line 30 to the level control network 29 for reducing the level variations at the input of the demodulator 32. The detection of the data signal is performed in the same manner as in the receiving device described with reference to FIG. 3. In the receiving device concerned, the output signal of the demodulator 32 is supplied through a low-bandpass filter 39 and a subsequent amplifier 40 to a full-wave rectifying circuit 41. In contrast with the receiving device shown in FIG. 3, in the receiving device concerned the strength of the signals produced behind the demodulator is substantially constant. In this case, it is sufficient to subtract a constant direct-voltage signal from the output signal of the rectifying circuit 41. This constant direct-voltage signal is supplied by a direct-voltage signal source 43. In this case the output signal of the rectifying circuit 41 and the direct-voltage signal of the source 43 are supplied in the same manner as in FIG. 3 to different inputs of a subtraction device 42. The output signal of the subtraction device is supplied through an amplitude-limiting amplfier 44 to a pulse regenerator 45 which is driven by a clock pulse source 46 and which regenerates the data signal in a manner already described.

In case of great level variations, the strength of the signals produced behind the demodulator may vary notwithstanding the level control. It may then be advantageous when the direct-voltage signal supplied to the subtraction device 42 is varied proportionally to the signal strength in the same manner as in the receiving device shown in FIG. 3. In the receiving device concerned, such a direct voltage signal may be derived from the level control signal appear on line 30, which signal is varied proportionally to the signal at strength of the signals produced behind the demodulator.

In the foregoing, the factor $n$ in the spectrum factor sin $n$ $\pi$ fT is chosen to be $n = 1$. FIG. 1 shows an embodiment of a transmitting device for $n = 1$ and associated receiving devices are shown in FIGS. 3 and 6. The arrangement of the transmitting device for other values of a can be derived from the part of the description referring to FIG. 1 and from the preceding part of the description concerning the signal transformation and the spectrum modification by replacing $n = 1$ by the other value chosen for $n$, for example, $n = 2$. When the signal transformation and the spectrum modification are adapted to each other, signals are produced from which the original signal can be recovered by full-wave rectification. The operation of the receiving device shown in FIGS. 3 and 6 is based on such a full-wave rectification these devices may therefore be universally employed for arbitrary values of $n$. For further details with respect to signals having frequency spectres which exhibit zero points and from which the original signals may be recovered by full-wave rectification, reference is made to the copending U.S. Pat. No. 3,456,199, filed Mar. 8, 1966, and also Philips Research Reports, volume 20, No. 4, August 1965, pages 469–484.

As stated above, the signal transformation may be dispe with in principle. This is explained with reference to FIG. 8 which shows an alternative embodiment of the receiving device shown in FIG. 6 which is suitable for use in combination with the transmitting device shown in FIG. 1 if in the latter device the signal transformation member 3–4 is omitted. For the sake of simplicity, FIG. 8 only shows the part of the receiving device located behind the demodulator and corresponding parts are designated by the same reference numerals. The output signal of the amplifier 40 in FIG. 8 is supplied to the input of a pulse modulator 49 which is driven by the clock pulse source 46. This clock pulse source supplies a train of equidistant clock pulses which are indicative of the centres of the signal elements of the output signal of the amplifier 40. In response to each clock pulse, the pulse modulator supplies an output pulse of short duration and of the same amplitude and polarity as the input signal. These output pulses are applied to two amplitude discriminator circuits 50 and 51 operative in opposite directions of conduction. The discriminator circuit 50 applies a positive discrimination voltage, which is designated by $p$, to the positive pulses, while the discriminator circuit 51 applies a negative discrimination voltage, which is designated by $q$, to the negative pulses. The discriminator circuits each pass a pulse for each input pulse of the correct polarity which exceeds in absolute sense the discrimination voltage. The output pulses of the discriminator circuit 50 are applied to one of the two inputs of a bistable trigger arrangement 52 and the output pulses of the discriminator circuit 51 are applied to the other input thereof. In response to an input pulse, the bistable trigger arrangement changes over to the position associated with the relevant input or it remains in this position if the latter has already been adjusted. The output signal of the trigger arrangement 52 is a data signal of standardized wave form.

The signal detection described is further explained by the signals shown in FIG. 9. FIG. 9*a* shows a representative output signal of the filter 39. The clock pulses shown in FIG. 9*b* are indicative of the centres of the signal elements of the signal shown in FIG. 9*a*. The output pulses of the pulse modulator 49 are shown in FIG. 9*c* in which the discrimination voltages $p$ and $q$ of the discriminator circuits 50 and 51 are indicated with dotted lines. FIG. 9*d* illustrates the output signal of the bistable trigger arrangement 52. This output signal is a data signal of standardized wave form which is identical with the input signal shown in FIG. 2*d* of the filter device 5 in the transmitting device of FIG. 1.

If desired, the receiving device shown in FIG. 8 may alternatively be used in combination with the transmitting device of FIG. 1 if in the latter device the signal transformation member 3–4 is employed. Consequently, it is required for the output signal of the trigger arrangement 52 to be subjected to an inverse signal transformation. The circuit arrangements required for this inverse signal transformation are indicated within the block 53 designated by a dotted line which should be added to the receiving device. The output signal of the trigger arrangement 52 is supplied in the block 53 on the one hand directly and on the other hand through a delay member 54 having a delay time T to a modulo 2 adding circuit 55. This adding circuit adds the two input signals modulo 2 and supplies at the output a signal constituted by a sequence of mark- and space elements, the mark elements corresponding with the transitions between the mark and space elements of the output signal of the trigger arrangement 52. This signal transformation is just the inverse of the change-of-state modulation performed in the transmitting device. The inverse signal transformation is further explained by the signals shown in FIG. 9. FIG. 9*d* shows the output signal of the trigger arrangement 52 and FIG. 9*e* shows the output signal thereof delayed by one pulse period T. The modulo 2 addition of these signals results in a sum signal which has a low signal level if the signals both have a high or a low signal level and which has a high signal level if one of the two signals has a high signal level. The resultant output signal of the adding circuit 55 is illustrated in FIG. 9*f*. This signal is identical with the data signal shown in FIG. 2*a* which is emitted by signal source 1.

In practice, the case in which the factor $n$ in the spectrum factor sin $n\,\pi fT$ is chosen to be $n = 2$ is of particular importance, since this spectrum factor introduces zero points into the frequency spectrum of the data signal at the frequency 0 c/s and at an integral multiple of half the pulse frequency. The zero point at one time half the pulse frequency which just lies within the transmission band renders it possible to introduce a pilot signal of half the pulse frequency for synchronizing the receiving device. This pilot signal transmission requires a few additional circuit arrangements which are shown in FIGS. 10 and 11. FIG. 10 shows an alternative embodiment of the transmitting device shown in FIG. 1 for $n = 2$ and FIG. 11 shows an alternative embodiment of the receiving device shown in FIG. 3 for $n = 2$. For the sake of simplicity, the modulator part and the demodulator part, respectively, which remain unchanged, are omitted in these figures. In FIG. 10, the data signal of the data signal source 56 is supplied, after a suitable signal transformation, for example, after two successive change-of-state modulations and subsequent spectrum modification in device 57, by a filter device 58 having an amplitude-frequency characteristic curve expressed by: sin $n\pi fT$ ($n$=2) through a sum producer 59 to a low-band-pass filter 60. The output signal thereof is then transmitted to the receiving device by single sideband modulation. The train of equidistant clock pulses of the clock pulse source 61 is applied to a binary stage 62 which changes its position in response to each clock pulse. The output signal of the binary stage 62 then has a fundamental frequency equal to half the pulse frequency and after a suitable delay by a delay member 63 and after subsequent amplitude adjustment by an adjustable damping network 64 the output signal is supplied to the sum producer 59 where it is added to the output signal of the filter device 58. The time delay of the delay member 63 is adjusted in a suitable manner so that the signal transitions of the clock signal supplied to the sum producer coincide with the centres of the signal elements of the output signal of the filter device 58. It is thus achieved that the signal amplitude of the last-mentioned signal elements remains unchanged during the centres of these elements, which permits of obtaining an optimum detection of the signal elements at the receiver end. In FIG. 11, the output signal of the synchronous demodulator is supplied a low-bandpass filter 65 to two circuits. The first of these two circuits is the detection circuit already described which is constituted by the cascade arrangement of an amplifier 66, a full-wave rectifying circuit 67, a subtraction device 68, an amplitude-limiting amplifier 69 and a pulse regenerator 70. A filter 71 selects in the manner already described the direct-voltage component of the output signal of the synchronous demodulator and supplies this component, after amplification by the amplifier 72, to the subtraction device 68.

If desired, the input of the detection circuit may be cut off by a suppression filter 79 tuned to half the pulse frequency, as shown in dotted lines, in order to cut off the pilot signal of half the pulse frequency. The second of the aforementioned circuits is a clock signal regeneration circuit. A filter 73 at the input of this circuit selects the pilot signal of half the pulse frequency and supplies this signal, after full-wave rectification by a full-wave rectifying circuit 74, to a filter 75 tuned to the pulse frequency. The full-wave rectification results in a frequency doubling so that the fundamental frequency of the output signal of the rectifying circuit 74 is equal to the pulse frequency. A sinusoidal output oscillation appears at the output of the filter 75 which is supplied to an amplitude-limiting amplifier 76 which converts the oscillation into a block voltage. This block voltage is supplied to a differentiating circuit 77. The output signal thereof consists of a train of alternatively positive and negative equidistant pulses. These pulses are applied to the rectifying circuit 78 which only passes the positive pulses. A train of equidistant positive pulses having a pulse period equal to that of the clock pulses at the transmitter end then appears at the output of the rectifying circuit 78. These output pulses are then applied to the pulse regenerator 70 for the regeneration of the data signal.

What is claimed is:

1. A system for the transmission of information in the form of a series of equidistant bivalent pulses, comprising a transmitter and a receiver, said transmitter comprising a source of said bivalent pulses, frequency spectrum modifying transmission network means having an amplitude-frequency characteristic defined by the expression sin $n\pi fT$, wherein $T$ is the period of said bivalent pulses, $f$ is the frequency of signals applied to said network, and $n$ is an integer including zero, means connecting said network to said source, a source of carrier oscillations, amplitude modulator means connected to modulate said oscillations with the output of said network means, means for transmitting only a single sideband including single sideband filter means, means connecting said filter means to the output of said modulator means, means for transmitting the output of said filter means to said receiver, means providing pilot oscillations of the same frequency as said carrier oscillations, and means for adding said pilot oscillations to the signal output of said filter means, said receiver comprising amplitude demodulator means for demodulating signals received thereby, and pulse regenerating means for regenerating pulses from the output of said demodulator means.

2. The system of claim 1 wherein said means in said transmitter for connecting said network to said source comprises pulse transmission means, and said receiver comprises full wave rectifier means, and means connecting said rectifier means between said demodulator means and regenerating means, and said means connecting said network to said source comprises pulse transformation means whereby the pulse output of said rectifier means is the same as said series of bivalent pulses.

3. The system of claim 1 in which said receiver comprises carrier wave regenerating means connected to produce a regenerated carrier oscillation from received pilot oscillations, and said amplitude demodulator means comprises synchronous demodulator means, and means for applying said regenerated carrier oscillations to said synchronous demodulator means.

4. The system of claim 1 wherein said receiver comprises level control means connected to control the level of signals applied to said amplitude demodulator means, means connected to the output of said amplitude demodulator means for producing a level control voltage, and means applying said level control voltage to said level control means.

5. The system of claim 1 wherein said receiver comprises bilateral amplitude discrimination circuit means, means connecting said discrimination circuit means between said demodulator means and regenerator means, a source of clock pulses.

6. The system of claim 2 wherein said receiver comprises subtracting circuit means connected between said rectifier means and regenerating means, means for deriving a direct level control voltage from the output of said amplitude demodulator means, and means for applying said level control voltage to said subtracting circuit means, whereby the output of said subtraction means has a discrimination level independent of the strength of the signal output of said amplitude demodulator means.

7. The system of claim 6 comprising bilateral amplitude-limiting circuit means connected between said subtracting circuit means and said regenerating means.

* * * * *